3,064,904
COMBINATION HYDRAULIC SWEEPER AND SPRAYER
William J. Roberts, 3600 SE. Crystal Springs Blvd., Portland, Oreg.
Filed May 11, 1959, Ser. No. 812,439
2 Claims. (Cl. 239—287)

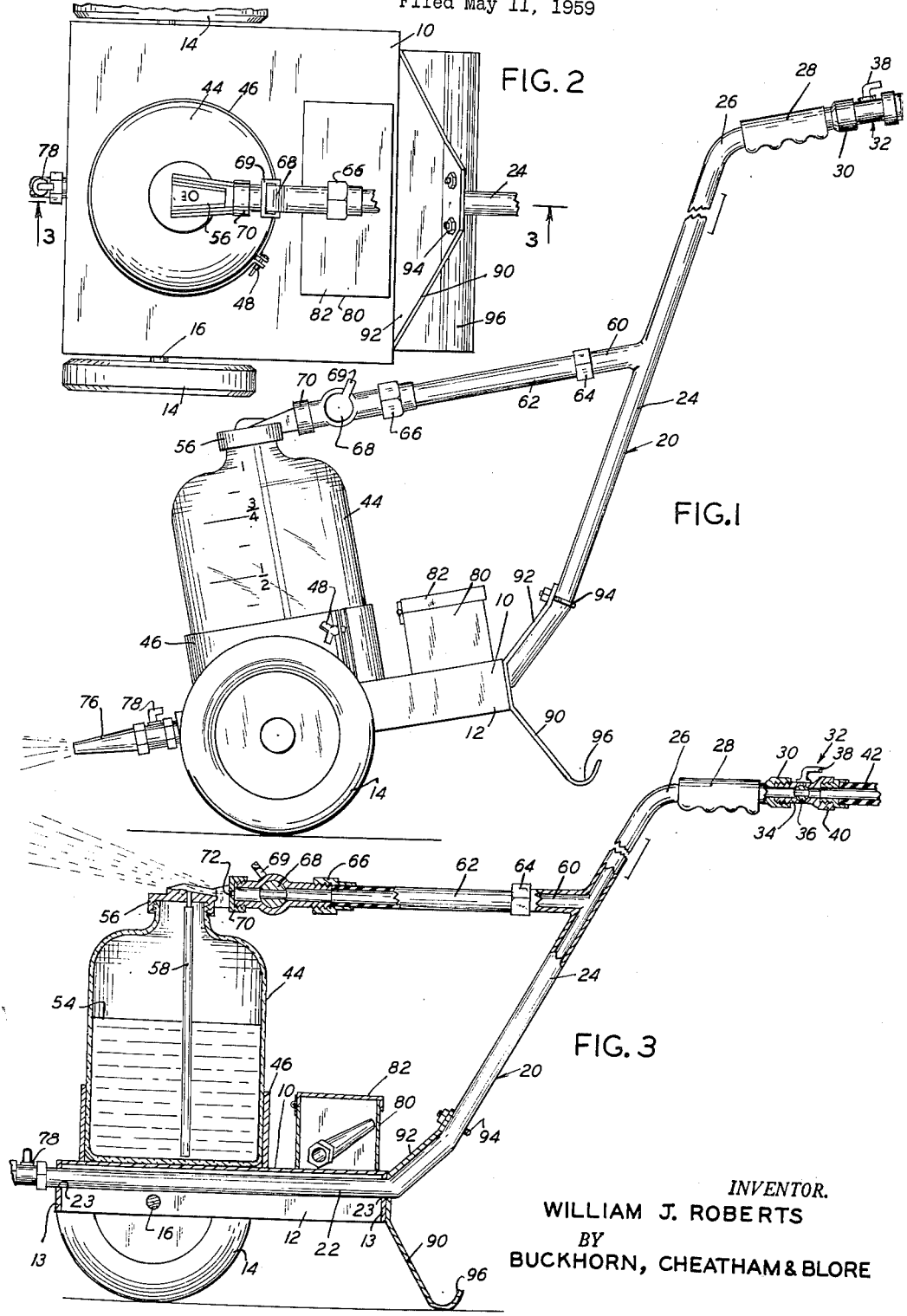
Nov. 20, 1962 — W. J. ROBERTS — 3,064,904
COMBINATION HYDRAULIC SWEEPER AND SPRAYER
Filed May 11, 1959
INVENTOR.
WILLIAM J. ROBERTS
BY
BUCKHORN, CHEATHAM & BLORE
ATTORNEYS

The present invention relates to a gardening device and more particularly to a device which may be used for spraying fertilizers, insecticides or the like upon vegetation, or alternatively may be used as an hydraulic sweeper for cleaning yards, sidewalks, driveways and the like.

To maintain a garden in a healthy condition it is necessary frequently to spray the plants with insecticides and fungicides and it is occasionally beneficial to apply a liquid fertilizer to the plants. The industrious home gardener also desires to maintain his yards and grounds neat and clean and spends considerable time sweeping, raking and hosing his lawn, driveways and walks to keep them in a neat condition.

It is a principal object of the present invention to provide a device that will facilitate the performance of both of the foregoing chores.

A particular object of the invention is to provide a new and improved device to assist the home gardener in applying insecticides, fungicides and fertilizers to his garden.

Another important object of the invention is to provide a device of the foregoing character which may be used alternatively as a hydraulic sweeper to assist the home gardener in keeping his premises neat and orderly.

Other objects and advantages of the invention will become more apparent hereinafter.

For a more detailed description of the invention, reference is made to the following detailed description thereof taken in conjunction with the accompanying drawings wherein:

FIG. 1 is a side elevation of the device in accordance with the invention;

FIG. 2 is a fragmentary top view thereof; and

FIG. 3 is a section of the device along line 3—3 of FIG. 1.

The illustrated embodiment of the invention comprises a platform 10 formed of metal or other suitable material having depending side flanges 12 and end flanges 13 to strengthen the same. The platform 10 is supported for movement over the ground by a pair of opposite wheels 14 disposed upon opposite sides thereof and mounted on a transverse axle 16 extending through the side flanges 12. As is apparent, the wheels 14 are mounted forwardly of the transverse centerline of the platform 10 for a purpose to be explained. Secured to the platform 10 is a rigid conduit 20 including a portion 22 which extends longitudinally of the platform beneath the same and projects partly forwardly of the forward end of the platform 10. The conduit portion 22 may be held in place by any suitable means, such as by inserting it through openings 23 in the end flanges 13. The conduit 20 also includes a portion 24 which extends angularly upwardly and rearwardly of the platform 10, the conduit being bent horizontally at its upper end to provide a handle 26 to which a hand grip 28 may be secured. The end of the handle portion 26 is formed with a threaded socket 30 into which may be threaded a valve 32 including a body 34, a valve member 36 and a handle 38 for rotating the valve member. A female coupling 40 may be provided on the valve body 34 for connecting the end of a garden hose 42 to the conduit 20.

Means are provided on the platform 10 for retaining thereon a supply of spray material such as fertilizer, insecticide or fungicide, such means in the illustrated embodiment comprising a vessel or jar 44 which is secured on the platform by means of an annular flange portion or ring band 46 suitably fixed to the platform 10 and having a screw clamp 48 so that the band may be tightened about the jar to hold it in position.

The jar 44 is provided with a suitable spraying head to cause the spray material indicated at 54 therein to be drawn from the jar and mixed with spray water. The illustrated spray head comprises an aspirator type including a body 56 threadedly secured to the top of the jar 44 and an aspirator tube 58 extending downwardly adjacent the bottom of the jar. With such a spraying device water is forced across the top of the spray head body 56 causing the spraying material within the jar 44 to be sucked up through the tube 58 and mixed with the water moving across the top of the body. In the illustrated embodiment, means are provided for diverting water from the conduit 20 including a branch conduit 60 extending from the upwardly inclined portion 24 toward the top of the jar 44. The branch 60 is connected to a length of flexible hose 62 by a suitable coupling 64, the hose in turn being connected by a suitable coupling 66 to a valve 68 having a handle 69 which may be operated to control the flow of water therethrough. The valve is connected to the spray head 56 by means of a coupler 70 integral with the head and having an orifice 72 to direct a stream of water from the valve onto the top of the body 56. Such spraying devices are old and well known and are shown, for example, in Patent No. 2,260,603.

The forward end of the conduit portion 22 is provided with means for connecting a spraying nozzle 76 thereto and is preferably provided with a valve 78 so that the flow of water through the nozzle 76 may be controlled. The nozzle 76 preferably is of a type to provide a jet-like stream of water so that it may be directed along the ground to effect sweeping action of debris thereon.

The platform 10 may also be provided with a storage container 80 having a hinged lid 82 and into which container spare nozzles and spraying heads for various purposes may be placed when not in use.

Bolted to the rear flange 13 is a relatively wide plate 90 including an upper trapezoidal shaped portion 92 to which the conduit portion 24 is clamped by means of a U-bolt 94. The lower edge of the plate 90 extends downwardly beneath the platform 10 and is reversely curved to form a ground-engaging foot 96 upon which the device may be rested when it is not in use. It will be observed that with the axle 16 positioned forwardly of the center of gravity of the platform 10 and with the vessel 44 and the major part of the conduit positioned rearwardly of the axle 16, the center of gravity of the device will also be rearwardly so that it will normally rest upon the stand 90.

If the device of the invention is to be used to spray fertilizer or other material, the supply of material to be sprayed is placed in the jar 44 and the valve 78 to the nozzle 76 closed. Water is then admitted by opening the valve 32 and the valve 68 adjusted to attain the desired amount of spray. The device can then be wheeled about the garden and manipulated by the gardener to direct the spray as desired. The valve 32 may be operated to start and stop the spraying as desired. When spraying fertilizer or insecticide, the device may be tilted forwardly about the axis of the wheels 14 or tilted rearwardly on the foot 96 and swung in either instance from side to side to direct the spray on the foliage of the vegetation being sprayed. The width of the foot 96 prevents the same from penetrating the ground or injuring the turf and facilitates swinging of the device to direct the spray.

In the event that it is desired to use the device as a sweeper, the valve 68 is closed and the valve 78 opened. The device then may be wheeled about the yard, swinging it from side to side and moving it to direct the water flow as desired, tilting the cart slightly forward, as shown in FIG. 1, so as to direct the jet of water from the nozzle 76 along the ground to sweep the debris along.

Having illustrated and described a preferred embodiment of the present invention, it should be apparent to those skilled in the art that the same permits of modification in detail and arrangement. I claim as my invention all such modifications as come within the true spirit and scope of the appended claims.

I claim:

1. A garden implement comprising an elongate pipe constituting a handle having means at its upper end for connection to a garden hose, a platform connected to said pipe at the lower end thereof, said platform being substantially horizontal, a vessel on said platform for retaining a supply of material to be sprayed, a spray head on said vessel, conduit means connecting said head to said pipe, a pair of supporting wheels mounted one on each of the opposite sides of said platform, the axis of said wheels being forwardly with respect to said handle of the center of gravity of said implement, a single supporting stand secured to the rearward edge of said platform and extending downwardly therefrom, said stand being reversely curved along its lower edge to provide a ground engaging foot, said foot being spaced from said platform so as to engage the ground when said platform is substantially horizontal, said stand being relatively wide in the transverse direction and extending equidistantly on the opposite sides of the longitudinal center line of said implement so as to provide a wide ground engaging foot whereby said platform may be tilted forwardly about the axis of said wheels or rearwardly about said foot and swung thereon from side to side to direct the spray from said head.

2. A combination hydraulic sweeping and spraying device for coupling to a garden hose comprising a wheeled platform formed of sheet metal and comprising a flat, horizontal portion having a forward and rear edge, said horizontal portion being provided with an upwardly directed flange means to hold a vessel in position thereon, an elongate rigid conduit secured to said platform with one end of said conduit directed forwardly of said platform, said conduit extending angularly upwardly rearwardly of said platform and being bent to form a handle for propelling the platform, means on the upper end of said conduit for coupling the same to a garden hose, means on said one end of said conduit for connecting a spray nozzle thereon, a vessel removably mounted on said platform within said flange means for retaining a supply of liquid fertilizer or the like, an aspirator and spraying head on said vessel, said conduit having a branch in the upwardly inclined portion thereof extending toward said vessel, a flexible hose connecting said branch conduit to said aspirator and spraying head, and valve means for alternatively directing water through said spraying nozzle and said spraying head.

References Cited in the file of this patent

UNITED STATES PATENTS

| Number | Name | Date |
|---|---|---|
| 836,442 | Dunning | Nov. 20, 1906 |
| 1,128,856 | Cornwall et al. | Feb. 16, 1915 |
| 1,640,546 | Isenhart et al. | Aug. 30, 1927 |
| 2,061,932 | Budwig | Nov. 24, 1936 |
| 2,571,476 | Offutt | Oct. 16, 1951 |
| 2,761,732 | Anthon | Sept. 4, 1956 |
| 2,889,994 | French | June 9, 1959 |